Figure 1:
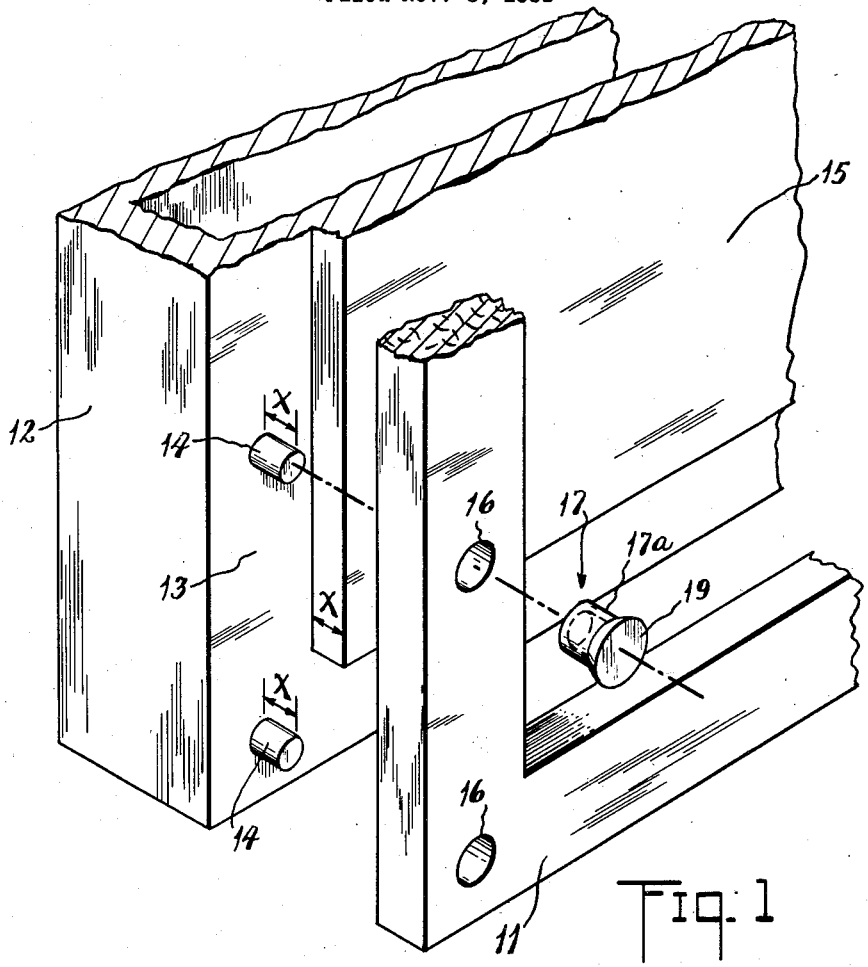

May 13, 1958

W. T. BERG 2,834,440

SPACERS FOR HOLDING A GASKET IN PLACE AND
FOR OBTAINING SLIT WIDTH WITH
THERMAL DIFFUSION PLATES

Filed Nov. 3, 1953

INVENTOR.
WENDELL T. BERG

BY

ATTORNEYS

United States Patent Office 2,834,440
Patented May 13, 1958

2,834,440

SPACERS FOR HOLDING A GASKET IN PLACE AND FOR OBTAINING SLIT WIDTH WITH THERMAL DIFFUSION PLATES

Wendell T. Berg, Euclid, Ohio, assignor to The Standard Oil Company, Cleveland, Ohio, a corporation of Ohio Application November 3, 1953, Serial No. 390,070

2 Claims. (Cl. 189—36)

The present invention relates to gaskets and, more particularly, to novel and improved apparatus for attaching a gasket to one of two surfaces between which it is to be compressed and for limiting the compression of the gasket.

Gaskets are extensively used in the assembling of present day machinery as a means for sealing the junctions between various components of the machinery. For example, gaskets play an extremely important part in the construction of thermal diffusion units which utilize two spaced-apart parallel walls. The relative spacing or distance between the two parallel walls of a thermal diffusion unit is critical and any variation in that spacing produces marked changes in the operating results obtained by these units. Since a fluid flow is maintained between the two spaced-apart walls of the thermal diffusion unit, a gasket must be utilized to form a liquid-tight enclosure, in cooperation with the two spaced-apart parallel walls, for the fluid flow.

Conventional types of thermal diffusion units employ spaced-apart parallel walls having longitudinal dimensions on the order of several feet, whereas the spacing between these walls is on the order of 0.15 inch. It is readily apparent that the assembling of apparatus of this type involves a difficult problem in the accurate adjusting of the position of the gaskets during the assembly process and in the accurate determination of the spacing of the elements between which the gasket is compressed. Further, the resiliency and shape of known gasket materials changes with time, thus permitting variations in the relative spacing of the spaced-apart members separated by the gasket. As aforementioned, variations in the spacing of the parallel spaced-apart walls of a thermal diffusion unit produces marked changes in the operating results obtained by these units. Therefore, it is of extreme importance that these changes or variations be either eliminated or minimized.

It is an object of the invention, accordingly, to provide novel and improved apparatus for supporting a gasket during assembly and for limiting the compression of the gasket upon assembly.

In accordance with the invention, means are provided for fixing the position of a gasket relative to at least one of the members between which it is to be compressed and, additionally, inserting a relatively non-compressible member within the gasket so as to limit the compression of the gasket.

Figure 1A:
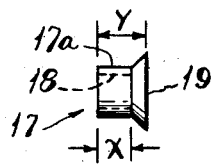

The invention will be more clearly understood by reference to the following detailed description taken in conjunction with the accompanying figures of the drawing, in which:

Fig. 1 is an exploded view of a gasket holding means and a gasket in relation to a surface upon which a gasket is to be mounted, in accordance with the invention; and Fig. 1A is a side view of the gasket holding means of Fig. 1.

In Fig. 1, there is shown a gasket 11 mounted upon a supporting plate 12, for example, one of the plates of a thermal diffusion unit. A gasket receiving recess 13 is included in the outer surface of the supporting plate 12. One or more gasket holding studs 14 are placed in the gasket receiving recess 13. Preferably, a plurality of these studs are used and are equally spaced along the length of the gasket receiving recess 13.

The gasket holding stud 14 may be of any suitable material and configuration, for example, it is shown as a cylindrical piece of metal bar stock. The gasket holding stud 14 is permanently secured in the gasket receiving recess 13 at right angles to the surface of the recess and finished so as to protrude to the same plane as the working surface 15 of the supporting plate 12.

The gasket 11 has a hole 16 punched therein and located to correspond to the position of the gasket holding stud 14, when the gasket 11 is placed in the gasket receiving recess 13, and to receive the gasket holding stud 14.

A cap 17 is inserted into the gasket hole 16. The cap 17 has a hollow cylindrical recess 18 at one end thereof in its shank 17a, as shown in the side view of Fig. 1A, and a head 19, having a thickness equal to the desired spacing of the members between which the gasket is to be compressed.

In assembling the apparatus, the cap 17 is inserted into the gasket hole 16 and the gasket is secured to the gasket holding stud 14 by a press fit of the cap 17 to the gasket holding stud 14. The shank 17a of the cap 17 is designed to be of the same length, shown as X in Fig. 1, as the height of the gasket holding stud 14 above the surface of the gasket receiving recess 13, also denoted as X in Fig. 1. Similarly, the depth of the gasket holding recess 13 is also equivalent to the distance X.

Therefore, when the cap 17 is press fitted onto the gasket holding stud 14, it will be apparent that the cap 17 will protrude above the plane of the working surface 15 of the plate 12 by an amount equal to the desired separation of the members between which the gasket is to be compressed. Further, the overall length Y, as shown in Fig. 1A, of the cap 17 should be substantially less than the uncompressed thickness of the gasket 11. Thus, when the supporting plate 12 is assembled with its companion plate (not shown), the gasket 11 is compressed until the companion plate engages the non-compressible head 19 of the cap 17.

Therefore, in accordance with the invention, a novel and improved apparatus has been provided for supporting a gasket in position during an assembling operation and also for limiting the compression of the gasket.

It will be obvious that the above embodiment is merely exemplary and that it is susceptible of variation and modification within the spirit and scope of the invention. Therefore, the invention is not deemed to be limited otherwise than as specified in the appended claims.

I claim:

1. Apparatus for use with a gasket having substantially parallel lateral faces to be assembled between two parallel spaced-apart members which are required to be spaced apart a critical distance, one of said spaced-apart members having a gasket receiving recess therein and said gasket having a thickness greater than the combined depth of said gasket receiving recess and said critical distance, and having an aperture between and communicating with said lateral faces, comprising a gasket holding stud fixedly mounted in said gasket receiving recess in corresponding relation to said aperture and having a height equivalent to the depth of said gasket receiving recess, a cap member snugly receiving said gasket holding stud and being received by said aperture in said gasket, said cap member having a non-compressible head thereon of a thickness equivalent to the desired spacing between said two spaced-apart members when assembled and said non-compressible head being contiguous with one end of said gasket holding stud opposite said receiving recess so as to serve as a positive stop which controls the spacing between the spaced-apart members.

2. In apparatus as described in claim 1, said cap member having a shank portion including a cylindrical recess at the end opposite said non-compressible head snugly receiving said gasket holding stud, said shank portion of said cap member having a length equivalent to the height of said gasket holding stud.

References Cited in the file of this patent

UNITED STATES PATENTS

| | | |
|---|---|---|
| 2,055,103 | Hewitt | Sept. 22, 1936 |
| 2,154,012 | Rhodes | Apr. 11, 1939 |
| 2,532,891 | Chupp | Dec. 5, 1950 |

FOREIGN PATENTS

| | | |
|---|---|---|
| 976,137 | France | Oct. 25, 1950 |